US005789519A

United States Patent [19]
Slack et al.

[11] Patent Number: 5,789,519
[45] Date of Patent: Aug. 4, 1998

[54] HIGH VISCOSITY, HIGH EQUIVALENT WEIGHT POLYISOCYANATE MIXTURES CONTAINING ALLOPHANATE AND ISOCYANURATE GROUPS AND THEIR USE IN COATING COMPOSITIONS

[75] Inventors: William E. Slack, Moundsville, W. Va.; Douglas A. Wicks, Lebanon, Pa.

[73] Assignee: Bayer Corporation, Pittsburgh, Pa.

[21] Appl. No.: 629,948

[22] Filed: Apr. 12, 1996

[51] Int. Cl.$^6$ ................................................ C08G 18/30
[52] U.S. Cl. ........................... 528/49; 528/73; 544/193; 544/222; 252/182.2
[58] Field of Search ................ 528/49, 73; 544/193, 544/222; 252/182.2

[56] References Cited

U.S. PATENT DOCUMENTS

| | | | |
|---|---|---|---|
| 3,903,127 | 9/1975 | Wagner et al. | 260/453 AB |
| 4,801,663 | 1/1989 | Ueyanagi et al. | 525/528 |
| 5,124,427 | 6/1992 | Potter et al. | 528/67 |
| 5,235,018 | 8/1993 | Potter et al. | 528/49 |
| 5,258,482 | 11/1993 | Jacobs et al. | 528/49 |

Primary Examiner—Rachel Gorr
Attorney, Agent, or Firm—Joseph C. Gil; Thomas W. Roy

[57] ABSTRACT

The present invention is directed to a polyisocyanate mixture which i) is prepared from a monomeric starting material containing
   a) 95 to 100% by weight, based on the weight of a) and b), of an aliphatic diisocyanate having 4 to 18 carbons in the hydrocarbon chain and
   b) 0 to 5% by weight, based on the weight of a) and b), of a diisocyanate other component a), ii) has an equivalent weight that is at least 30% greater than the average molecular weight of the monomeric starting material and a viscosity of greater than 10,000 to 100,000 mPa.s when determined at 25° C. on a sample having a solids content of 100% and containing less than 2% by weight of unreacted diisocyanates a) and b), and iii) contains isocyanurate groups and allophanate groups in a molar ratio of 10:1 to 1:10, wherein the allophanate groups are derived from urethane groups that are the reaction product of starting material i) with 0.01 to 0.6 moles, per mole of starting material i), of a monoalcohol having a molecular weight of up to 2500.

The present invention also relates to the use of these polyisocyanate mixtures, optionally in blocked form, as an isocyanate component in one- or two-component coating compositions.

21 Claims, No Drawings

HIGH VISCOSITY, HIGH EQUIVALENT WEIGHT POLYISOCYANATE MIXTURES CONTAINING ALLOPHANATE AND ISOCYANURATE GROUPS AND THEIR USE IN COATING COMPOSITIONS

BACKGROUND OF THE INVENTION

1. Field of the Invention

The present invention is directed to high viscosity, high equivalent weight polyisocyanate mixtures which contain allophanate groups and isocyanurate groups, and to their use in one- and two-component coating compositions.

2. Description of the Prior Art

Presently, there are an increasing number of government regulations which limit the amount of volatile solvents which may be present in coating compositions. In order to reduce the viscosity of the coating compositions, many attempts have been made to reduce the viscosity of the individual components of the coating compositions, particularly the isocyanate component. By reducing the viscosity of the coating composition, less solvent will be necessary to attain the required processing viscosity.

The viscosity of the polyisocyanate component has been reduced by developing products which have lower equivalent weights and, thus, lower viscosities, e.g., U.S. Pat. No. 3,903,127; 4,801,663; and 5,124,427.

Because of their lower viscosities, less solvent is needed to reduce the viscosity of the resulting coating composition to the viscosity required for subsequent processing.

Despite the efforts to develop high solids coating compositions by reducing the viscosities of polyisocyanates, there is a need to further reduce the amount of organic solvents present in coating compositions in order to meet government regulations. The Applicants have discovered that it is possible to reduce the amount of solvent that is necessary to attain the required processing viscosity for two-component coating compositions by the use of polyisocyanates containing isocyanurate groups which have high viscosities and high equivalent weights. It is totally unexpected in view of the literature available on coatings that it would be possible to increase the solids content of a coating composition by increasing the equivalent weight and, thus, the viscosity of the polyisocyanate component.

One of the disadvantages of these isocyanurate group-containing polyisocyanates is that to increase their viscosity requires a lengthy reaction procedure which causes the polyisocyanate component to yellow and renders it unsuitable for many coating applications. Accordingly, it is an object of the present invention to provide coating compositions which retain the advantages of the coating compositions based on isocyanurate-group containing polyisocyanates, but which may be used to prepare coatings with improved yellowness properties.

This object may be achieved with the coating compositions of the present invention in which the polyisocyanate component contains a mixture of isocyanurate groups and allophanate groups.

SUMMARY OF THE INVENTION

The present invention is directed to a polyisocyanate mixture which i) is prepared from a monomeric starting material containing a) 95 to 100% by weight, based on the weight of a) and b), of an aliphatic diisocyanate having 4 to 18 carbons in the hydrocarbon chain and b) 0 to 5% by weight, based on the weight of a) and b), of a diisocyanate other component a), ii) has an equivalent weight that is at least 30% greater than the average molecular weight of the monomeric starting material and a viscosity of greater than 10,000 to 100,000 mPa.s when determined at 25° C. on a sample having a solids content of 100% and containing less than 2% by weight of unreacted diisocyanates a) and b), and ii) contains isocyanurate groups and allophanate groups in a molar ratio of 10:1 to 1:10, wherein the allophanate groups are derived from urethane groups that are the reaction product of starting material i) with 0.01 to 0.6 moles, per mole of starting material i), of a monoalcohol having a molecular weight of up to 2500.

The present invention also relates to the use of these polyisocyanate mixtures, optionally in blocked form, as an isocyanate component in one- or two-component coating compositions.

DETAILED DESCRIPTION OF THE INVENTION

In a preferred embodiment of the present invention the polyisocyanate mixtures are prepared from a) 95 to 100%, preferably 100% by weight of one or more organic diisocyanates represented by the formula

wherein R' represents a divalent aliphatic hydrocarbon group having 4 to 18, preferably 4 to 12 carbon atoms and b) 0 to 5% by weight of one more organic diisocyanates represented by the formula

wherein R" represents a divalent cycloaliphatic hydrocarbon group having 5 to 15 carbon atoms, a divalent araliphatic hydrocarbon group having 7 to 15 carbon atoms and a divalent aromatic hydrocarbon group having 6 to 15 carbon atoms.

Examples of suitable aliphatic diisocyanates a) include 1,4-tetramethylene diisocyanate, 1,6-hexamethylene diisocyanate, 2,2,4-trimethyl-1,6-hexamethylene diisocyanate, 1,12-dodecamethylene diisocyanate. Examples of suitable diisocyanates b) include cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 2,4'-diisocyanato-dicyclohexyl methane, 1,3- and 1,4-bis-(isocyanatomethyl)-cyclohexane, bis-(4-isocyanato-3-methyl-cyclohexyl)-methane, xylylene diisocyanate, α,α,α',α'-tetramethyl-1,3- and/or -1,4-xylylene diisocyanate, 1-isocyanato-1-methyl4(3)-isocyanato-methyl cyclohexane, and 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate, 1,5-diisocyanato naphthalene and mixtures thereof.

The preferred diisocyanate a) is 1,6-hexamethylene diisocyanate. Preferred diisocyanates b) are isophorone diisocyanate, bis-(4-isocyanatocyclohexyl)-methane, 2,4- and/or 2,6-toluylene diisocyanate and 2,4- and/or 4,4'-diphenylmethane diisocyanate. Most preferably 1,6-hexamethylene diisocyanate is used as the sole starting material.

It is also possible in accordance with the present invention to use blends of the previously mentioned diisocyanates with monoisocyanates or polyisocyanates having 3 or more isocyanate groups.

Suitable methods and catalysts for the preparation of polyisocyanates containing isocyanurate groups and allophanate groups are known and described in U.S. Pat. Nos. 5,124,427, 5,208,334 and 5,235,018, the disclosures of which are herein incorporated by reference. The trimerization of the starting diisocyanate mixture may be carried out in the absence or in the presence of solvents which are inert to isocyanate groups. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

In accordance with the present invention urethane groups and subsequently allophanate groups are incorporated into the polyisocyanates by the use of aliphatic, cycloaliphatic, araliphatic or aromatic monoalcohols, i.e., alcohols in which the hydroxyl group is attached to aliphatic, cycloaliphatic, araliphatic or aromatic group. The monoalcohols may be linear, branched or cyclic, contain at least one carbon atom and have a molecular weight of up to 2500. The monoalcohols may optionally contain other hetero atoms in the form of, e.g., ether groups.

The molar ratio of monoalcohol to diisocyanate is about 0.01:1 to 0.60:1, preferably about 0.02:1 to 0.50:1 and more preferably about 0.05:1 to 0.50:1. Preferred monoalcohols are hydrocarbon monoalcohols.

The hydrocarbon monoalcohols preferably contain 1 to 36, more preferably 1 to 20 and most preferably 1 to 8 carbon atoms. Examples of suitable monoalcohols include methanol, ethanol, n-propanol, isopropanol, n-butanol, isobutanol and tert. butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, cyclohexanol, benzyl alcohol, phenol, the cresols, the xylenols, the trimethylphenols, decanol, dodecanol, tetradecanol, hexadecanol, octadecanol, 2,6,8-trimethylnonanol, 2-t-butyl-cyclohexanol, 4-cyclohexyl-1-butanol, 2,4,6,-trimethyl benzyl alcohol, branched chain primary alcohols and mixtures thereof (which are available from Henkel under to Standamul trademark) and mixtures of linear primary alcohols (which are available from Shell under the Neodol trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuralcohol and other monoalcohols which have a molecular weight of up to 2500 and are based on ethylene oxide, propylene oxide and/or butylene oxide.

It is also possible in accordance with the present invention to use mixtures of the previously described monoalcohols.

When the polyisocyanates containing isocyanurate groups and allophanate groups accordingly to the invention are prepared from monoalcohols containing ethylene oxide units, the polyisocyanates may be dispersed in water as described in U.S. Pat. No. 5,200,489, the disclosure of which is herein incorporated by reference.

The reaction temperature for isocyanurate and allophanate formation in accordance with the present invention is about 40° to 180° C., preferably about 80° to 150° C. and more preferably about 90° to 120° C.

The process according to the invention may take place either batchwise or continuously, for example, as described below. The starting diisocyanate is introduced with the exclusion of moisture and optionally with an inert gas into a suitable stirred vessel or tube and optionally mixed with a solvent which is inert to isocyanate groups such as toluene, butyl acetate, diisopropylether or cyclohexane. The previously described monoalcohol may be introduced into the reaction vessel in accordance with several embodiments. The monoalcohol may be prereacted with the starting diisocyanate to form urethane groups prior to introducing the diisocyanates into the reaction vessel; the monoalcohol may be mixed with the diisocyanates and introduced into the reaction vessel; the monoalcohol may be separately added to the reaction vessel either before or after, preferably after, the diisocyanates are added; or the catalyst may be dissolved in the monoalcohol prior to introducing the solution into the reaction vessel.

In accordance with another embodiment of the present invention the polyisocyanates may be prepared by blending polyisocyanates containing isocyanurate groups with polyisocyanates containing allophanate groups.

At a temperature of about 40° C. and in the presence of the required catalyst or catalyst solution the trimerization begins and is indicated by an exothermic reaction. As the reaction temperature increases the conversion rate of urethane groups to allophanate groups increases faster than the formation of isocyanurate groups. Accordingly, at some temperature for a given degree of trimerization, the urethane groups are substantially converted to allophanate groups, while at some lower temperature unreacted urethane groups remain. The progress of the reaction is followed by determining the NCO content by a suitable method such as titration, refractive index or IR analysis. Thus, the reaction may be terminated at the desired degree of trimerization. The trimerization reaction is generally terminated when 40 to 90%, preferably 45 to 65%, of the isocyanate groups have reacted. When using 1,6-hexamethylene diisocyanate as the sole monomeric starting material, these percentages correspond to an NCO content for the reaction mixture of 5 to 30%, preferably 18 to 28%.

By terminating the reaction at a lower NCO content than is conventionally done to prepare low viscosity polyisocyanates, higher viscosity polyisocyanates are obtained due to the formation of polyisocyanurates, polyallophanates and other higher molecular weight polyisocyanates containing both isocyanurate groups and allophanate groups.

The termination of the trimerization reaction can take place, for example, by the addition of a catalyst poison of the type named by way of example in the above-mentioned literature references. For example, when using basic catalysts the reaction is terminated by the addition of a quantity, which is at least equivalent to the catalyst quantity, of an acid chloride such as benzoyl chloride. When using heat-labile catalysts, for example, the previously described quaternary ammonium hydroxides, it is possible, though not preferred, to dispense with the addition of a catalyst poison since these catalysts decompose during the course of the reaction. When using such catalysts, the catalyst quantity and the reaction temperature are preferably selected such that the catalyst, which continuously decomposes, is totally decomposed when the desired degree of trimerization is reached. The quantity of catalyst or reaction temperature which is necessary to achieve this decomposition can be determined by a preliminary experiment. It is also possible initially to use a lesser quantity of a heat sensitive catalyst than is necessary to achieve the desired degree of trimerization and to subsequently catalyze the reaction by a further incremental addition of catalyst, whereby the quantity of catalyst added later is calculated such that when the desired degree of trimerization is achieved, the total quantity of catalyst is spent.

The use of suspended catalysts is also possible. These catalysts are removed after achieving the desired degree of trimerization by filtering the reaction mixture.

The working-up of the reaction mixture, optionally after previous separation of insoluble catalyst constituents, may take place in various ways depending upon how the reaction was conducted and the area of application for the isocyanates. Any unreacted monomer present in the polyisocyanate product and optionally any solvent used during the trimerization reaction may be removed by distillation in known manner. The product obtained after distillation generally contains a total of less than 2% by weight, preferably less than 1% by weight, based on the solids content of the polyisocyanate mixture, of free (unreacted) monomeric diisocyanates. The products according to the invention are generally viscous liquids having a minimum viscosity of greater than 10,000, preferably greater than 12,000 and more preferably greater than 15,000 and a maximum viscosity of 100,000, preferably 90,000 and more preferably 70,000, when determined at 25° C. on a sample having a solids content of 100% and containing less than 2% by weight of unreacted diisocyanates a) and b).

The polyisocyanate mixtures according to the invention are almost colorless, i.e., they have a yellowness index as measured on the APHA color scale of 10 to 150, preferably 10 to 100 and more preferably 10 to 50. The polyisocyanate mixtures have an average functionality of at least 2, preferably 2 to 7 and more preferably 2.5 to 5; and an equivalent weight which is at least 30% greater, preferably 40% greater and more preferably 50% greater, than the average molecular weight of the monomeric starting material used to prepare the polyisocyanate mixture.

The products according to the present invention are polyisocyanates containing isocyanurate groups and allophanate groups. The products may also contain residual urethane groups which have not been converted to allophanate groups depending upon the temperature maintained during the reaction and the degree of isocyanate group consumption. However, the content of urethane groups (calculated as NHCOO, MW 59) should be less than 10% by weight, preferably less than 5% by weight and more preferably less than 2%, based on the solids content of the polyisocyanate mixture. The ratio of isocyanurate groups to allophanate groups in the polyisocyanates according to the invention is about 10:1 to 1:10, preferably about 5:1 to 1:7. These values may be determined spectroscopically or by gel permeation chromatography (GPC) using a standard.

The products according to the invention are valuable starting materials for use in two-component coating compositions for the production of polyisocyanate polyaddition products. Polyisocyanate component A) is used in combination with compounds containing at least two isocyanate-reactive groups, such as hydroxyl groups and/or amino groups, preferably hydroxyl groups. The isocyanate-reactive component preferably has a viscosity (at 25° C. and a solids content of 100%) which is greater, preferably 20% greater and more preferably 50% greater than the viscosity of polyisocyanate component A). The products according to the invention may also be used as moisture-cure resins.

Preferred reaction partners for the products according to the invention, which may optionally be present in blocked form, are the polyhydroxy polyesters, polyhydroxy polyethers, polyhydroxy polyacrylates, polyhydroxy polylactones, polyhydroxy polyurethanes, polyhydroxy polyepoxides and optionally low molecular weight, polyhydric alcohols known from polyurethane coatings technology. Polyamines, particularly in blocked form, for example as polyketimines, oxazolidines or polyaldimines are also suitable reaction partners for the products according to the invention. Also suitable are polyaspartic acid derivatives (aspartates) containing secondary amino groups, which also function as reactive diluents.

To prepare the coating compositions the amount of the polyisocyanate component and the isocyanate reactive component are selected to provide equivalent ratios of isocyanate groups (whether present in blocked or unblocked form) to isocyanate-reactive groups of about 0.5 to 20, preferably 0.8 to 3 and more preferably about 0.9 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methyl-piperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The products according to the invention are also valuable starting materials for two-component polyurethane stoving enamels in which the isocyanate groups are used in a form blocked by known blocking agents.

The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as ε-caprolactam and δ-valerolactam; oximes such as butanone oxime, methyl amyl ketoxime and cyclohexanone oxime; mercaptans such as methyl mercaptan, ethyl mercaptan, butyl mercaptan, 2-mercaptobenzthiazole, a-naphthyl mercaptan and dodecyl mercaptan; and triazoles such as 1H-1,2,4-triazole.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

Due to their high equivalent weights, the products according to the invention, when blended with a suitable isocyanate reactive component will need less solvent to obtain a particular processing viscosity than a similar coating composition prepared from a corresponding low viscosity, low equivalent weight polyisocyanate and the same isocyanate reactive component when both coating compositions are prepared at the same equivalent ratio of isocyanate groups to isocyanate reactive groups.

The coating compositions containing the polyisocyanates according to the invention provide coatings which have improved dry times, adhere surprisingly well to a metallic base, and are particularly light-fast, color-stable in the presence of heat and very resistant to abrasion. Furthermore, they are characterized by high hardness, elasticity, very good resistance to chemicals, high gloss, good weather resistance, good environmental etch resistance and good pigmenting qualities. The polyisocyanates according to the invention also possess good compatibility with highly branched polyester resins.

The invention is further illustrated, but is not intended to be limited by the following examples in which all parts and percentages are by weight unless otherwise specified.

EXAMPLES

Polyisocyanate 1—According to the invention

To a reactor equipped with a gas bubbler, stirrer, thermometer and dropping funnel were added 100 parts of hexamethylene diisocyanate (HDI). The stirred HDI was heated to 90° C. while dry nitrogen was bubbled through the HDI. To the stirred HDI were added 4.4 parts of n-butanol containing 0.0068 parts of trimethylbenzyl ammonium hydroxide at such a rate that the 90° C. temperature was maintained. After the addition was complete the reaction mixture was held at 90° C. for an additional 15 minutes followed by the addition of 0.0068 parts of di-(2-ethylhexyl) phosphate to terminate the reaction. The reaction mixture had an NCO content of 21.9%. The excess monomer was removed by wiped thin film evaporation to provide a clear liquid having an APHA of <50, a viscosity of 53,100 mPa.s (25° C.), an NCO content of 15.8%, and a free monomer (HDI) content of <0.1%.

Using the procedure described in Example 1, additional polyisocyanates were prepared using the reactants and conditions set in in Table 1.

of allophanate groups surprisingly improves the color of the high equivalent weight, high viscosity polyisocyanates.

To demonstrate that high solids coating compositions can be prepared with the high viscosity polyisocyanates according to the invention, coating compositions were prepared from the following ingredients. One coating composition contained Polyisocyanate 4 as the polyisocyanate component, while the other contained a commercially available isocyanurate group-containing polyisocyanate prepared from 1,6-hexamethylene diisocyanate (HDI) and having an isocyanate content of 21.6%, a content of monomeric diisocyanate of <0.2% and a viscosity at 20° C. of 3000 mPa.s (available from Miles Inc. as Desmodur N 3300).

In both compositions the NCO/OH equivalent ratio was 1.1:1.0, the solids content was 38.4% by weight and the VOC content was 5.0 lbs/gal. The coating compositions contained the following ingredients:

|  | Composition according to the invention | Comparison Composition |
|---|---|---|
| Component 1 |  |  |
| Polyol A[4] | 37.19 | 39.61 |
| Additive[5] | 0.24 | 0.24 |
| Catalyst A[6] | 0.12 | 0.12 |
| Butyl acetate | 21.29 | 20.03 |
| Total Solvent | 39.89 | 39.84 |
| Component 2 |  |  |
| Polyisocyanate from Example 4 | 6.16 | — |
| Commercial Polyisocyanate | — | 5.0 |

[4] - an acrylic polyol having a solids content of 50% (available from Miles as Desmophen A-450).
[5] - an acrylate copolymer (available as Byk 358 from Byk Chemie).
[6] - a 10% solution in butyl acetate of dibutyltin dilaurate (available as Metacure T-12 from Air Products and Chemicals).

| Example # | Alcohol | Parts Alcohol per 100 parts HDI | Parts Catalyst[1] | Crude % NCO | FINAL PRODUCT[2] % NCO | Equiv. wt. | % Increase in Equiv. wt.[3] | Visc. @ 25° C. mPa·s | APHA Color |
|---|---|---|---|---|---|---|---|---|---|
| 2 | 1-BuOH | 4.4 | 0.0050 | 25.1 | 17.3 | 243 | 44.5 | 18,000 | <25 |
| 3 | 1-BuOH | 4.4 | 0.0052 | 24.1 | 16.7 | 251 | 49.7 | 24,600 | <25 |
| 4 | 1-BuOH | 4.4 | 0.0064 | 23.3 | 16.4 | 256 | 52.4 | 41,200 | — |
| 5 | 1-BuOH | 6.0 | 0.0040 | 23.0 | 15.8 | 266 | 58.2 | 20,100 | <25 |
| 6 | 1-BuOH | 6.0 | 0.0045 | 20.1 | 14.9 | 282 | 67.8 | 83,400 | <25 |
| 7 | 1-BuOH | 10.0 | 0.0040 | 20.6 | 13.6 | 309 | 83.8 | 51,800 | <25 |
| 8 | Isocetyl | 14.4 | 0.0075 | 18.6 | 13.7 | 307 | 82.5 | 50,600 |  |
| 9 | Cyclohexanol | 5.9 | 0.0050 | 25.7 | 17.1 | 246 | 46.2 | 20,000 |  |
| 10 | Cyclohexanol | 5.9 | 0.0060 | 24.2 | 16.5 | 255 | 51.5 | 49,400 |  |
| 11 | Cyclohexanol | 5.9 | 0.0090 | 21.9 | 16.0 | 263 | 56.3 | 99,000 |  |
| 12 (Comp) | 1-BuOH | 0.12 | 0.0060 | 26.5 | 18.4 | 228 | 35.7 | 54,800 | 75 |

[1] - the same amount of di(2-ethylhexyl)phosphate was added.
[2] - the final product contained <0.1% free HDI Monomer.
[3] - % increase in equivalent weight compared to monomeric starting material.

In the preparation of the polyisocyanate of Comparison Example 12, a minor amount of alcohol was used to dissolve the catalyst. However, this amount was outside the scope of the present invention. The resulting product, which did not contain the amount of allophanate groups required by the present invention, had an APHA color of 75, while the polyisocyanates according to the invention, which did contain allophanate groups, had an APHA color of less than 25. It is apparent from the yellowness values that the presence The initial viscosity of the compositions was determined at 25° C. using a Brookfield LV Viscometer with a #2 spindle at 60 rpm.

Viscosity for composition according to the invention 125 mPa.s

Viscosity for comparison composition 130 mpa.s

The results demonstrate that even though the compositions according to the invention were prepared from a polyisocyanate having a viscosity of 41,200 mPa.s, they resulted in a lower viscosity than the comparison compositions, which were prepared from a polyisocyanate having a viscosity of 3000 mPa.s.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate mixture which
   i) is prepared from a monomeric starting material comprising
      a) 95 to 100% by weight, based on the weight of a) and b), of an aliphatic diisocyanate having 4 to 18 carbons in the hydrocarbon chain and
      b) 0 to 5% by weight, based on the weight of a) and b), of a diisocyanate other than component a),
   ii) has an equivalent weight that is at least 30% greater than the average molecular weight of said monomeric starting material and a viscosity of greater than 10,000 to 100,000 mpa.s when determined at 25° C. on a sample having a solids content of 100% and containing less than 2% by weight of unreacted diisocyanates a) and b), and
   iii) contains isocyanurate groups and allophanate groups in a molar ratio of 10:1 to 1:10, wherein the allophanate groups are derived from urethane groups that are the reaction product of starting material i) with 0.01 to 0.6 moles, per mole of starting material i), of a monoalcohol having a molecular weight of up to 2500.

2. The polyisocyanate mixture of claim 1 wherein said aliphatic diisocyanate is 1,6-hexamethylene diisocyanate.

3. The polyisocyanate mixture of claim I wherein said monoalcohol comprises a hydrocarbon monoalcohol containing 1 to 20 carbon atoms.

4. The polyisocyanate mixture of claim 2 wherein said monoalcohol comprises a hydrocarbon monoalcohol containing 1 to 20 carbon atoms.

5. The polyisocyanate mixture of claim 1 wherein said monoalcohol comprises a hydrocarbon monoalcohol containing 1 to 8 carbon atoms.

6. The polyisocyanate mixture of claim 2 wherein said monoalcohol comprises a hydrocarbon monoalcohol containing 1 to 8 carbon atoms.

7. The polyisocyanate mixture of claim 1 wherein said monoalcohol comprises 1-butanol.

8. The polyisocyanate mixture of claim 2 wherein said monoalcohol comprises 1-butanol.

9. A polyisocyanate mixture which
   i) is prepared from a monomeric starting material comprising
      a) 95 to 100% by weight, based on the weight of a) and b), of aliphatic diisocyanate having 4 to 18 carbon atoms in the hydrocarbon chain and
      b) 0 to 5% by weight, based on the weight of a) and b), of a diisocyanate other than component a),
   ii) has an equivalent weight that is at least 40% greater than the average molecular weight of said monomeric starting material and a viscosity of greater than 10,000 to 100,000 mpa.s when determined at 25° C. on a sample having a solids content of 100% and containing less than 2% by weight of unreacted diisocyanates a) and b), and
   iii) contains isocyanurate groups and allophanate groups in a molar ratio of 10:1 to 1:10, wherein the allophanate groups are derived from urethane groups that are the reaction product of starting material i) with 0.01 to 0.6 moles, per mole of starting material i), of a monoalcohol having 1 to 20 carbon atoms.

10. The polyisocyanate mixture of claim 9 wherein said aliphatic diisocyanate is 1,6-hexamethylene diisocyanate.

11. The polyisocyanate mixture of claim 9 wherein said monoalcohol comprises a hydrocarbon monoalcohol containing 1 to 8 carbon atoms.

12. The polyisocyanate mixture of claim 10 wherein said monoalcohol comprises a hydrocarbon monoalcohol containing 1 to 8 carbon atoms.

13. The polyisocyanate mixture of claim 9 wherein said monoalcohol comprises 1-butanol.

14. The polyisocyanate mixture of claim 10 wherein said monoalcohol comprises 1-butanol.

15. A polyisocyanate mixture which
   i) is prepared from a monomeric starting material comprising
      a) 95 to 100% by weight, based on the weight of a) and b), of aliphatic diisocyanate having 4 to 18 carbon atoms in the hydrocarbon chain and
      b) 0 to 5% by weight, based on the weight of a) and b), of a diisocyanate other than component a),
   ii) has an equivalent weight that is at least 50% greater than the average molecular weight of said monomeric starting material and a viscosity of greater than 15,000 to 100,000 mPa.s when determined at 25° C. on a sample having a solids content of 100% and containing less than 2% by weight of unreacted diisocyanates a) and b), and
   iii) contains isocyanurate groups and allophanate groups in a molar ratio of 10:1 to 1:10, wherein the allophanate groups are derived from urethane groups that are the reaction product of starting material i) with 0.01 to 0.6 moles, per mole of starting material i), of a monoalcohol having 1 to 20 carbon atoms.

16. The polyisocyanate mixture of claim 15 wherein said aliphatic diisocyanate is 1,6-hexamethylene diisocyanate.

17. The polyisocyanate mixture of claim 15 wherein said monoalcohol comprises a hydrocarbon monoalcohol containing 1 to 8 carbon atoms.

18. The polyisocyanate mixture of claim 16 wherein said monoalcohol comprises a hydrocarbon monoalcohol containing 1 to 8 carbon atoms.

19. The polyisocyanate mixture of claim 15 wherein said monoalcohol comprises 1-butanol.

20. The polyisocyanate mixture of claim 16 wherein said monoalcohol comprises 1-butanol.

21. A one- or two-component coating composition comprising the polyisocyanate of claim 1 and a compound containing isocyanate-reactive groups.

* * * * *